United States Patent [19]

Harvey et al.

[11] Patent Number: 5,756,139
[45] Date of Patent: May 26, 1998

[54] EGG WASHING AND DISINFECTION PROCESS

[75] Inventors: Anita Jane Harvey, Whittle Hall; Joseph William Gerard Malone, Roby; William Ronald Sanderson, Penketh, all of United Kingdom

[73] Assignee: Solvay Interox Limited, Warrington, England

[21] Appl. No.: 586,903

[22] PCT Filed: Jul. 29, 1994

[86] PCT No.: PCT/GB94/01639

§ 371 Date: Jan. 26, 1996

§ 102(e) Date: Jan. 26, 1996

[87] PCT Pub. No.: WO95/04126

PCT Pub. Date: Feb. 9, 1995

[30] Foreign Application Priority Data

Aug. 3, 1993 [GB] United Kingdom ............ 9316027

[51] Int. Cl.$^6$ .................................................. A23B 5/08
[52] U.S. Cl. .................. 426/298; 426/300; 426/302; 426/335; 426/442; 426/532; 422/28
[58] Field of Search .................. 426/300, 302, 426/335, 532, 298, 442; 422/28

[56] References Cited

U.S. PATENT DOCUMENTS 3,968,250 7/1976 Boucher .................. 424/333

5,545,374 8/1996 French et al. .................. 422/28

FOREIGN PATENT DOCUMENTS 281119  8/1990  Germany.
2162532 2/1986  United Kingdom.

OTHER PUBLICATIONS

Derwent abstract No. 74-28327V of Japanese Patent No. 49011722, Mar. 1974.

Derwent abstract No. 74-28328v of Japanese Patent No. 49011723, Mar. 1974.

Cihova. H. et al., "Decontamination of heg eggs by peracetic acid", Cesk. Hyg., pp. 249–256, (1990). Chemica abstract No. 30821p, vol. 74 (7), p. 30819, Feb. 1971.

*Primary Examiner*—Milton Cano
*Attorney, Agent, or Firm*—Larson & Taylor

[57] ABSTRACT

A process for the washing and/or disinfection of eggs is provided. The process comprises contacting the eggs with a nonionic surfactant, an amphoteric surfactant and an aqueous solution of a peracid. The surfactants and peracid solution may be combined, or may be employed in separate stages. Preferably, the solutions are sprayed onto the eggs, optionally in the presence of an antifoam. The preferred peracid is peracetic acid.

21 Claims, No Drawings

EGG WASHING AND DISINFECTION PROCESS

This invention concerns a process for washing and disinfecting eggs.

In recent years, there has been increasing public concern over the bacterial contamination of certain foodstuffs, and particularly in the case of hens eggs. Because of the conditions under which a large proportion of eggs is produced, the eggs are often contaminated with dirt including faecal matter debris from broken eggs and feathers. This contamination can provide a breeding ground for bacteria, and because of the nature of the egg shell, these bacteria can penetrate through the shell and can contaminate the internal membranes of the eggs. This has caused concern in the case of eggs for human consumption and also in the case of breeder eggs, where it is desired to reduce the exposure of chicks to the risk of infection. There is particular concern in the case of enterobacteriaceae because members of this family are intestinal parasites and common causes of ill health, including food-related diseases. The Ministry of Agriculture Fisheries and Food have a separate standard for numbers of enterobacteriaceae in addition to the standard for total bacterial numbers. Contaminated eggs are also less likely to be accepted by consumers for aesthetic reasons and also because the contamination may mask faults, e.g. cracks in the egg shell. It is therefore desirable that the eggs should be washed and/or disinfected to reduce the chances of contamination of the internal membranes and to increase their acceptability to consumers.

The nature both of the contamination and of the egg shell itself pose particular problems for the washing and disinfection of eggs. In many cases, the contamination has dried on to the shell to a substantial degree and cannot easily be rinsed away. The removal of the contamination therefore often requires the use of cleaning agents. However, the porous nature of the egg shell is such that the internal membranes of the shell may be damaged by contact with too aggressive a washing/disinfection agent. It is therefore expedient that a washing/disinfection system is identified that is sufficiently aggressive to be able to cope with the extent of contamination, but which is compatible with the internal membranes of the eggs.

East German Patent No 281119 teaches a nonionic and anionic surfactant system with an alkaline solution of a peracid that can be used for the washing of conveyor belts for eggs during its maintenance period but does not teach that this system is compatible with the internal membranes of eggs. The constraints upon materials suitable for disinfecting hard surfaces such as conveyor belts are markedly different from those applying to porous surfaces bounded by a membrane.

European Patent Application No 0 388 071 teaches the use of a combination of detergent plus bactericide for the washing of eggs but does not provide any further teaching as to the nature of such systems.

W. A. Moats in the Journal of Food Protection, 1978, Vol 41 No. 11 pp 919–925 reviews the factors involved in egg washing. Chlorine based disinfectants are stated to suffer from a rapid loss of activity caused by the soiling of the eggs. The use of quaternary ammonium salt disinfectants is the most favoured, but even with these, the results are stated to be variable. The use of quaternary ammonium salt disinfectants is now under pressure as a result of their generally poor biodegradability.

Hartmann and Carlin in Research Notes, 1957, pp 673–675 discuss the use of peracetic acid for the disinfection of eggs. A contact time of at least one minute is stated to be required, but in the presence of egg solids, significantly longer contact times, up to 4 minutes, are needed.

It is an object of the present invention to provide a process for the washing and/or disinfection of eggs that is compatible with the internal membranes of the eggs.

It is a further object of certain embodiments of the present invention to provide a process for the washing and/or disinfection of eggs that overcomes or ameliorates at least some of the disadvantages of the prior art processes.

According to one aspect of the present invention, there is provided a process for the washing and/or disinfection of eggs, characterised in that the eggs are contacted with an aqueous solution comprising effective amounts of:

i. a nonionic surfactant, and
  ii. an amphoteric surfactant, and subsequently the eggs are contacted with an aqueous solution comprising an effective amount of an organic peracid.

According to a second aspect of the present invention, there is provided a process for the washing and/or disinfection of eggs, characterised in that the eggs are contacted with an aqueous solution comprising effective amounts of:

i. a nonionic surfactant, and
  ii. an amphoteric surfactant, and
  iii. an organic peracid.

The nonionic surfactants which are employed in the process according to the present invention are represented by the general chemical formula

$$R-(OCH_2CH_2)_n-(OCH_2CHCH_3)_p-(OCH_2CH_2)_q-O-R'$$

wherein R represents an alkyl group of at least 6 carbon atoms n, p and q each represent an integer, and R' represents hydrogen or an alkyl or aryl group. R often contains from about 6 to about 18 carbons, and especially from about 8 to about 12 carbons and in many instances comprises a linear group. R can be synthetically derived, or can be obtained from natural sources, for example, from tallow or from coconut oil. When R' represents an alkyl group, the alkyl group often contains no more than 6 carbon atoms, and most often from 1 to 4 carbon atoms. When R' represents an aryl group, the aryl group often comprises from 6 to 10 carbon atoms and is typically a benzyl group. The weight proportion of alkoxylate i.e. the total of ethoxylate and propoxylate in the surfactant is often selected in the region of about 55% to about 90%; n+p+q in many instances totalling from 4 to 30. It will be recognised by one skilled in the art that although the general formula shows the ethoxylate and propoxylate groups as being present in discrete blocks, and this indeed may be the case in certain embodiments, the individual groups may be distributed more randomly throughout the alkoxylate chain without departing from the general formula above. Where p has a value of 1 or greater, the ratio of n+q:p can be selected in the range from about 25:1 to 1:25. On account of the fact that the higher the degree of propoxylation, and hence the lower the ratio of n+q:p, often results in reduced biodegradability of the surfactant, it is most often the case that the ratio of n+q:p will be selected in the range from about 25:1 to 1:1, particularly from about 10:1 to about 2:1.

The effective concentration of nonionic surfactant in the process according to the present invention will usually not be greater than about 5% w/w. In many cases, the concentration will not exceed 2% w/w and will often not exceed 1% w/w. In certain embodiments, good results have been achieved employing a concentration of nonionic surfactant of from 0.01 to about 0.5%.

The amphoteric surfactants which are employed in the process according to the present invention can be selected from betaines, including fatty dimethyl betaines, fatty amidopropyidimethyl betaines, fatty bishydroxyethyl betaines and fatty dimethylsulphobetaines. In most cases, however, the amphoteric surfactants will be defined by the general chemical formula:

R—NR'—X where R represents an optionally substituted alkyl or aryl group, R' represents hydrogen or an optionally substituted alkyl or aryl group, and X is selected from one of the groups having the respective formulae:

Formula (1)

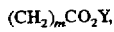

$(CH_2)_m CO_2 Y$, where m is an integer and Y represents hydrogen or a monovalent cation such as sodium, potassium or ammonium, or Formula (2)

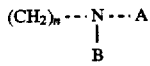

$(CH_2)_n$ --- N --- A
          |
          B where n is an integer. A represents a group having the formula:

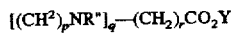

$[(CH^2)_p NR"]_q$—$(CH_2)_r CO_2 Y$ where p, q and r represent integers, R" represents hydrogen or an alkyl or aryl group, and Y represents hydrogen or a monovalent cation such as sodium, potassium or ammonium, and B represents hydrogen, an alkyl or aryl group or may have the same general formula as A. In certain preferred embodiments, the amphoteric surfactant has the general formula where X corresponds to formula (2) above, q is zero and B has the same general formula as A.

In the amphoteric surfactants employed in many embodiments of the present invention, R often contains from about 6 to about 18 carbons, and especially from about 8 to about 14 carbons and in many instances comprises a linear group. R can be synthetically derived, or can be obtained from natural sources, for example, from tallow or from coconut oil. In one particular class of amphoterics, R is derived from imidazoline.

It will be recognised by those skilled in the art that many amphoteric surfactants contain significant amounts of halide ions, particularly chloride ions, which arise from the processes employed in their manufacture. Such amphoterics can be employed in the process according to the present invention. In many embodiments however, the process can result in the amphoteric solution being contacted with metal equipment, particularly steel. In certain aspects, the amphoteric surfactant and peracid are incorporated in the same solution, but even when this is not the case, at least some of the amphoteric solution may also be carried over with the eggs into the peracid solution. Because chloride is well known to cause corrosion in metals, and can also cause the decomposition of peracids, it is preferred to employ substantially halide-free amphoterics.

In the most preferred embodiments, the amphoteric surfactant employed comprises a disodium dicarboxyethyl alkylpropylenediamine, particularly a substantially halide free solution of disodium dicarboxyethyl cocopropylenediamine.

The effective concentration of amphoteric surfactant in the process according to the present invention will usually not be greater than about 5% w/w. In many cases, the concentration will not exceed 2% w/w and will often not exceed 1% w/w. In certain embodiments, good results have been achieved employing a concentration of amphoteric surfactant of from 0.01 to about 0.5% w/w.

The weight ratio of nonionic surfactant to amphoteric surfactant is often selected in the range of from about 10:1 to 1:10, and is commonly from about 5:1 to about 1:5. In certain embodiments, good results have been achieved employing a weight ratio of from 3:1 to 1:1.

The solution of nonionic and amphoteric surfactant is conveniently generated by the dilution of a concentrate containing the components in an appropriate ratio. Such concentrates typically comprise greater than 5% by weight of each of amphoteric and nonionic surfactants. In many embodiments, the concentration of amphoteric surfactant in the concentrate is from about 7% to about 30% by weight, preferably from about 10% to about 20% by weight, and the concentration of nonionic surfactant is from about 10% to about 50% by weight, preferably from about 20% to about 30% by weight.

The organic peracid employed in the process according to the present invention can be any organic peracid which is sufficiently soluble in water and which exerts a disinfectant effect on contaminated eggs. In many embodiments, the peracid will be selected from the group comprising C1 to C6 aliphatic peracids, particularly peracetic acid and perpropionic acid, with peracetic acid being particularly preferred.

In the process according to the present invention, the peracid is present in the aqueous solution with which the contaminated eggs are contacted at sufficient concentration to have a disinfectant effect on the eggs. In many cases, the concentration of peracid will be no greater than 10,000 ppm, and will usually be from about 10 ppm to about 5,000 ppm. In certain embodiments, good results have been achieved employing a concentration of peracetic acid in the range from about 200 ppm to about 1500 ppm.

The peracid solution is often conveniently prepared by the dilution of a concentrated peracid solution. Often, this concentrated solution will comprise an equilibrium mixture of the peracid, the corresponding organic acid, hydrogen peroxide and water. Such concentrated solutions do not usually comprise greater than 50% by weight peracid and in most embodiments comprise from about 0.5% to about 45% by weight peracid. Peracid concentrations in the range from about 3% to about 20% by weight are particularly preferred. It will be recognised by those skilled in the art that for a given peracid concentration, the hydrogen peroxide and organic acid concentrations can vary widely. In many cases, the concentration of hydrogen peroxide in the peracid concentrates will be less than 30% by weight, usually in the range from about 5% to about 25% by weight, and the concentration of organic acid will usually be less than 75%, usually in the range from about 5% to about 60%.

In certain embodiments of the present invention, the peracid solution comprises a ratio of organic acid to peracid greater than 5:1, such as those described in co-pending British Patent Application no. 9219465.3 which is incorporated herein by reference. Such compositions are particularly suitable for applications where the peracid solution is to be diluted with hard water.

The contact between the eggs and the surfactant and peracid solution(s) can be effected in a number of different ways which will be readily apparent to those skilled in the art. For example, the eggs can be transported on a suitable belt which is so arranged as to pass through baths of the solution(s) thus effecting cleaning, the speed of the belt and the volume of the solution being selected to give a contact time which achieves effective washing and/or disinfection. In many cases, it is preferable for the surfactant and peracid solution(s) to be employed in the form of a jet or a spray. This has the benefit that in addition to the chemical cleaning and disinfection action of the solution(s), there is also a physical cleaning effect resulting from the solution(s) impinging upon the eggs. Where such a jet or spray is employed, it is preferable that the solution(s) be collected and recycled in order to reduce chemical usage and hence reduce the costs of the process. When recycling is employed, the solution(s) will usually be analysed periodically for the active components and the concentrations adjusted accordingly to ensure the concentrations remain in the desired range. Examples of suitable machines adapted for the use of jets or sprays are those disclosed in European Patent Application No. 0 388 071.

The process according to the present invention can be carried out by immersing the eggs in a surfactant solution, preferably with some form of agitation of the solution e.g. stirring for a given period, and then adding a peracid solution and continuing the contact for an appropriate period until the desired washing and/or disinfection is complete. In some cases, particularly where sprays or jets are employed, the process will be carried out by employing a single solution comprising surfactants and peracid. In many cases, the process will be carried out by employing separate stages for contact of the eggs with respectively surfactant solution and peracid solution.

In certain embodiments of the present invention, the process can comprise a pre-rinse stage in which the eggs are rinsed with water to remove loosely adhering contamination, the inclusion of such a stage being at the discretion of the user. In embodiments wherein separate surfactant and peracid contact stages are employed, a rinse with water between such stages can be employed. This may be preferred if the surfactant solution comprises halide ions at a concentration sufficient to decompose a significant fraction of the peracid, e.g. if a halide-containing amphoteric is employed. Pre-rinses and rinses with water between contact stages are preferably carried out using a spray or jet. In a number of desirable embodiments, a plurality of surfactant and/or peracid contact stages can be employed, such as two or three stages. Water rinses may be employed between some or all of these stages.

The process according to the present invention will normally be carried out at a temperature of between ambient temperature, typically from 10° to 25° C. but variable depending on the climate and the season, and about 55° C. In certain embodiments, good results have been achieved employing a temperature of between 40° and 45° C. It will be recognised that it is desirable to avoid higher temperatures than these because of the general desire to avoid denaturing the proteins contained in the eggs. Where separate treatment stages are employed, the temperatures employed can differ from one stage to another, although in many cases, the temperatures will be the same in each stage.

The contact times employed in the process according to the present invention can vary widely and are typically selected on the basis of, for example, the extent of contamination, and the temperature employed. In many cases, the time for a surfactant contact stage is selected to be up to about 10 minutes, usually in the range from about 10 seconds to about 5 minutes. The time for a peracid contact stage is usually selected to be less than 5 minutes, and is usually less than 2 minutes.

The surfactant solution employed in the process according to the present invention is preferably selected to be relatively low foaming. However, in many cases, particularly where a jet or spray contact is employed, the generation of foam may present something of a problem. In such cases, it is desirable that an antifoaming agent is employed. This can either be added as a separate component or can be included in the surfactant concentrate. Suitable antifoams will be readily apparent to those skilled in the art, and in many instances can be selected from EO/PO block copolymers having a cloud point below that of the temperature at which the contact is taking place and polysiloxanes. In certain embodiments, it is convenient for the antifoam to be incorporated in the concentrated surfactant solution to avoid the need for separate dosing. Where this is the case, it is desirable that the antifoam should form a phase stable system with the surfactant concentrate. In many such systems, phase stable systems have been achieved employing antifoams comprising dimethylpolysiloxane and silica filler.

In one preferred aspect of the present invention, there is provided a process for the washing and/or disinfection of eggs, characterised in that the eggs are sprayed with an aqueous solution comprising effective amounts of:

i. a nonionic surfactant having the general chemical formula

$$R\text{---}(OCH_2CH_2)_n\text{---}(OCH_2CHCH_3)_p\text{---}(OCH_2CH_2)_q\text{---}O\text{---}R'$$

wherein R represents an alkyl group having from 6 to 18 carbon atoms, n, p and q each represent an integer, and R' an alkyl group having from 1 to 4 carbon atoms or an aryl group having from 6 to 10 carbon atoms ii. an amphoteric surfactant comprising disodium dicarboxyethyl cocopropylenediamine. and subsequently the eggs are contacted with an aqueous solution comprising from 200 to 1500 ppm of peracetic acid.

In a second preferred aspect of the present invention, there is provided a process for the washing and/or disinfection of eggs, characterised in that the eggs are sprayed with an aqueous solution comprising effective amounts of:

i. a nonionic surfactant having the general chemical formula:

$$R\text{---}(OCH_2CH_2)_n\text{---}(OCH_2CHCH_3)_p\text{---}(OCH_2CH_2)_q\text{---}O\text{---}R'$$

wherein R represents an alkyl group having from 6 to 18 carbon atoms, n, p and q each represent an integer, and R' an alkyl group having from 1 to 4 carbon atoms or an aryl group having from 6 to 10 carbon atoms, ii. an amphoteric surfactant comprising disodium dicarboxyethyl cocopropylenediamine, and iii. an aqueous solution comprising from 200 to 1500 ppm of peracetic acid.

On completion of the desired washing and/or disinfection, one skilled in the art will recognise that in many embodiments it is desirable that the eggs should be dried, particularly where long term storage of the eggs will subsequently be employed. Drying of the eggs is desirable to reduce losses caused, for example by rot. Drying can be achieved in a number of convenient ways including contacting the eggs with a suitable absorbent medium, or drying with air and/or heat.

The process of the present invention can be employed for the washing and disinfection of eggs from domestic birds, particularly hens or game birds, whether for consumption or otherwise, for example, for breeding. In addition, the process can be contemplated for use in zoos and wildlife parks for the eggs of more exotic birds, including ostriches, penguins, parrots and the like.

Having described the invention in general terms, specific embodiments thereof are described in greater detail by way of example only.

EXAMPLE 1

Preparation of Surfactant Concentrate 1 liter of surfactant concentrate was prepared by adding with stirring at 30° C., in order, 257.85 g demineralised water, 472 g of a disodium dicarboxyethyl cocopropylenediamine amphoteric surfactant (30% w/w aqueous solution) commercially available in the United Kingdom under the Trademark "Ampholak YCE", 270 g of nonionic surfactant (99% w/w) commercially available in the United Kingdom under the Trademark "Ethylan CD964" and 0.15 g of a silicone antifoam commercially available in the United Kingdom under the Trademark "Basildon C100N".

EXAMPLE 2

Washing/Disinfection of Hens' Eggs

Contaminated hens' eggs were passed along a conveyor belt, and contacted with a spray of a solution comprising 10,600 ppm of the surfactant composition according to Example 1. The eggs were then contacted with a spray of a solution comprising 13,600 ppm of the surfactant composition according to Example 1. Finally, the eggs were contacted with spray of a solution comprising 140 ppm of peracetic acid. The solutions employed in all three stages were at 42° C. prior to spraying. Contact time for each stage were less than 2 minutes The peracetic acid solution was prepared by aqueous dilution of a commercially available concentrate sold under the Trademark "Proxitane 0510" comprising 5% peracetic acid.

Visual examination of the eggs after completion of the process revealed them to be substantially free of contamination and to have a very good bloom.

EXAMPLE 3

Contaminated eggs were washed using a three chamber egg washing machine. In chamber 1, the wash employed a spray of 4,000 ppm, at a solution temperature of 39° C. prior to spraying, of an alcohol ethoxylate commercially available in the United Kingdom under the Trademark "Synperonic A7", 8,800 ppm of a 40% w/w disodium dicarboxyethyl octylpropylenediamine solution commercially available in the United Kingdom under the Trademark "Ampholak YJH-40" and 1000 ppm of an antifoam commercially available in the United Kingdom under the Trademark "Basildon FD10". In chamber 2, the wash employed a spray of 4,000 ppm "Synperonic A7", 8,800 ppm "Ampholak YJH-40" and 1000 ppm of an antifoam "Basildon FD10" at a solution temperature of 42° C. prior to spraying. In chamber 3, a spray of a solution of 100 ppm peracetic acid produced by dilution of "Proxitane 0510" was employed at a solution temperature of 50° C. prior to spraying.

Visual inspection of the eggs showed excellent cleaning.

EXAMPLE 4

Washing of Breeder Eggs

Contaminated breeder hens eggs were washed with a single tank egg washing machine. The washing solution comprised 21,700 ppm of a surfactant composition according to Example 1, and 225 ppm peracetic acid produced by aqueous dilution of a commercially available concentrate sold under the Trademark "Proxitane 0510" comprising 5% peracetic acid. A solution temperature of 42° C. prior to spraying was employed. The washing solution was sprayed onto the eggs. No foaming was observed, and visual inspection of the eggs showed excellent cleaning.

EXAMPLE 5

Disinfection Trial

Contaminated eggs were washed using a three chamber egg washing machine. In chamber 1, the wash employed a spray of 3,000 ppm of an alcohol ethoxylate commercially available in the United Kingdom under the Trademark "Synperonic A7", 7,000 ppm of a 30% w/w alkyldimethyl betaine solution commercially available in the United Kingdom under the Trademark "Ampholak BCM-30" and 1000 ppm of an antifoam commercially available in the United Kingdom under the Trademark "Basildon V12" at a solution temperature of 39° C. prior to spraying. In chamber 2, the wash employed a spray of 3,000 ppm "Synperonic A7", 7,000 ppm "Ampholak BCM-30" and 1000 ppm of an antifoam "Basildon V12" at a solution temperature of 42° C. prior to spraying. In chamber 3, a solution of 100 ppm peracetic acid produced by aqueous dilution of "Proxitane 0510" was employed at a solution temperature of 50° C. prior to spraying.

The bacterial contamination of the eggs before and after the washing process is given in Table 1 below, together with the Ministry of Agriculture Fisheries and Food (MAFF) standard for bacterial contamination of eggs. Total viable bacterial counts were determined using plate count agar, and enterobacteriaceae counts were determined using violet Red Bile glucose Agar.

TABLE 1

Results of Disinfection Trials

| Sample | Area of Egg | Total Bacteria (cfu/egg) | Enterobacteriaceae (cfu/egg) |
|---|---|---|---|
| Unwashed | Inner shell/membrane | $2.7 \times 10^4$ | $2.5 \times 10^3$ |
|  | Outer shell | $1.1 \times 10^4$ | $2.0 \times 10^1$ |
| Washed | Inner shell/membrane | $8.5 \times 10^2$ | 0 |
|  | Outer Shell | $3.0 \times 10^1$ | 0 |
| MAFF Standard | — | $3 \times 10^2 - 3 \times 10^3$ | $1 \times 10^2 - 1 \times 10^3$ |

From the results in Table 1, it can be seen that the washing process was effective at reducing the numbers of bacteria, particularly enterobacteriaceae, to within the MAFF targets.

EXAMPLE 6

Contaminated eggs were washed using a three chamber egg washing machine. In chamber 1, the wash employed a spray of 3,000 ppm of an alcohol ethoxylate commercially available in the United Kingdom under the Trademark "Synperonic A7", 5,250 ppm of a 40% w/w disodium dicarboxyethyl octylpropylenediamine solution commercially available in the United Kingdom under the Trademark "Ampholak YJH-40" and 1000 ppm of an antifoam commercially available in the United Kingdom under the Trademark "Antifoam FD", commercially available from Basildon Chemicals, at a solution temperature of 39° C. prior to spraying. In chamber 2, the wash employed a spray of 3,000 ppm "Synperonic A7", 5,250 ppm "Ampholak YJH-40" and 1000 ppm of "Antifoam FD" at a solution temperature of 42° C. prior to spraying. In chamber 3, a solution of 500 ppm peracetic acid produced by dilution of aqueous "Proxitane 0510" was employed at a solution temperature of 50° C. prior to spraying.

Visual examination of the eggs showed that excellent cleaning was achieved.

We claim:

1. A process for the washing and disinfection of eggs, comprising contacting eggs with an aqueous solution comprising:

i. a nonionic surfactant, and ii. an amphoteric surfactant, and subsequently contacting the eggs with an aqueous solution comprising an organic peracid, the amount of the surfactants and the peracid being sufficient to effect cleaning and disinfection of the eggs.

2. A process for the washing and/or disinfection of eggs, comprising contacting eggs with an aqueous solution comprising:

i. a nonionic surfactant, and ii. an amphoteric surfactant, and iii. an organic peracid, the amount of the surfactants and the peracid being sufficient to effect cleaning and disinfection of the eggs.

3. A process according to claim 1 or 2, wherein the organic peracid is selected from the group consisting of peracetic acid and perpropionic acid.

4. A process according to claim 3, wherein the peracid is present in the solution at a concentration of from about 10 ppm to 5000 ppm.

5. A process according to claim 4 wherein the peracid is present in the solution at a concentration of from 200 to 1500 ppm.

6. A process according to claim 1 or 2, wherein the nonionic surfactant has the general chemical formula:

R—(OCH$_2$CH$_2$)$_n$—(OCH$_2$CHCH$_3$)$_p$—(OCH$_2$CH$_2$)$_q$—O—R' wherein R represents an alkyl group having from 6 to 18 carbon atoms, n, p and q each represent an integer, and R' represents an alkyl group having from 1 to 4 carbon atoms or an aryl group having from 6 to 10 carbon atoms.

7. A process according to claim 1 or 2, wherein the amphoteric surfactant is substantially halide free.

8. A process according to claim 1 or 2, wherein the amphoteric surfactant comprises disodium dicarboxyethyl cocopropylenediamine.

9. A process according to claim 1 or 2, wherein the nonionic surfactant is present in the solution at a concentration of from about 0.01 to about 0.5% by weight.

10. A process according to claim 1 or 2, wherein the amphoteric surfactant is present in the solution at a concentration of from about 0.01 to about 0.5% by weight.

11. A process according to claim 1 or 2 wherein the weight ratio of the nonionic surfactant to the amphoteric surfactant is within the range of 10:1 to 1:10.

12. A process according to claim 11 wherein the nonionic surfactant is present in the aqueous solution in an amount of from 0.01 to 5% by weight.

13. A process according to claim 12 wherein the peracid is present in the aqueous solution in a concentration of from 10 to 10,000 ppm.

14. A process according to claim 11 wherein the amphoteric surfactant is present in the aqueous solution in an amount of from 0.01 to 5% by weight.

15. A process according to claim 14 wherein the peracid is present in the aqueous solution in a concentration of from 10 to 10,000 ppm.

16. A process according to claim 11 wherein the nonionic and amphoteric surfactants are each present in the aqueous solution in an amount of from 0.01 to 5% by weight.

17. A process according to claim 16 wherein the peracid is present in the aqueous solution in a concentration of from 10 to 10,000 ppm.

18. A process according to claim 11 wherein the peracid is present in the aqueous solution in a concentration of from 10 to 10,000 ppm.

19. A process for the washing and/or disinfection of eggs, comprising spraying eggs with an aqueous solution comprising:

i. from 0.1 to 5% by weight of a nonionic surfactant having the general formula

R—(OCH$_2$CH$_2$)$_n$—(OCH$_2$CHCH$_3$)$_p$—(OCH$_2$CH$_2$)$_q$—O—R' wherein R represents an alkyl group having from 6 to 18 carbon atoms, n, p and q each represent an integer, and R' represents an alkyl group having from 1 to 4 carbon atoms or an aryl group having from 6 to 10 carbon atoms ii. from 0.01 to 5% by weight of an amphoteric surfactant comprising disodium dicarboxyethyl cocopropylenediamine, and subsequently contacting the eggs with an aqueous solution comprising from 200 to 1500 ppm of peracetic acid.

20. A process according to claim 1, 2 or 19, wherein the surfactant solution(s) additionally comprise an antifoam.

21. A process according to claim 20, wherein the antifoam comprises dimethylpolysiloxane and silica filler.

* * * * *